US012574162B2

(12) United States Patent
Jia et al.

(10) Patent No.: US 12,574,162 B2
(45) Date of Patent: Mar. 10, 2026

(54) SIGNAL TRANSMISSION METHOD AND APPARATUS AND COMMUNICATION SYSTEM

(71) Applicant: 1FINITY Inc., Kawasaki (JP)

(72) Inventors: Meiyi Jia, Beijing (CN); Guorong Li, Beijing (CN); Yang Lu, Beijing (CN)

(73) Assignee: 1FINITY Inc., Kawasaki (JP)

( * ) Notice: Subject to any disclaimer, the term of this patent is extended or adjusted under 35 U.S.C. 154(b) by 359 days.

(21) Appl. No.: 17/488,445

(22) Filed: Sep. 29, 2021

(65) Prior Publication Data

US 2022/0022262 A1     Jan. 20, 2022

Related U.S. Application Data

(63) Continuation of application No. PCT/CN2019/085333, filed on Apr. 30, 2019.

(51) Int. Cl.
H04L 1/1812 (2023.01)
H04W 24/08 (2009.01)
(Continued)

(52) U.S. Cl.
CPC ........... H04L 1/1819 (2013.01); H04W 24/08 (2013.01); H04W 72/23 (2023.01);
(Continued)

(58) Field of Classification Search
CPC . H04W 74/0833; H04W 24/08; H04W 72/23; H04W 72/569; H04W 80/02;
(Continued)

(56) References Cited

U.S. PATENT DOCUMENTS 9,178,662 B2    11/2015   Park et al.
2011/0261763 A1    10/2011   Chun et al.
(Continued)

FOREIGN PATENT DOCUMENTS

CN      108029119 A    5/2018
CN      108365934 A    8/2018
(Continued)

OTHER PUBLICATIONS

Notice of Reasons for Refusal issued by the Japan Patent Office for corresponding Japanese Patent Application No. 2021-562934, mailed on Jan. 4, 2023, with an English translation.
(Continued)

*Primary Examiner* — Thai Nguyen
(74) *Attorney, Agent, or Firm* — Myers Wolin, LLC

(57)                ABSTRACT

A signal transmission method and apparatus and a communication system. The signal transmission method includes: a terminal equipment receives a random access response, the random access response being associated with multiple uplink grants; and the terminal equipment transmits a message 3 by using one or more uplink grants in the multiple uplink grants; wherein at least one uplink grant in the one or more uplink grants is used to transmit initial transmission of the message 3. With this application, terminal equipment may procedure multiple uplink grants provided by a network device.

13 Claims, 6 Drawing Sheets

| R | HARQ process ID |
|---|---|
| | TAC |
| TAC | UL Grant |
| UL Grant | |
| UL Grant | |
| UL Grant | |
| TC-RNTI | |
| TC-RNTI | |

(51) Int. Cl.

| | | |
|---|---|---|
| *H04W 72/23* | (2023.01) | |
| *H04W 72/566* | (2023.01) | |
| *H04W 74/0833* | (2024.01) | |
| *H04W 80/02* | (2009.01) | |

(52) U.S. Cl.
  CPC ..... *H04W 72/569* (2023.01); *H04W 74/0833* (2013.01); *H04W 80/02* (2013.01)

(58) Field of Classification Search
  CPC . H04W 4/70; H04W 74/0841; H04W 74/002; H04L 1/1819; H04L 1/1887; H04L 1/1896; H04L 1/1822; H04L 5/00; H04L 1/1812
  See application file for complete search history.

(56) References Cited

U.S. PATENT DOCUMENTS

| | | | |
|---|---|---|---|
| 2016/0227575 | A1 | 8/2016 | Furuskog et al. |
| 2017/0273056 | A1* | 9/2017 | Papasakellariou .... H04W 52/44 |
| 2017/0273113 | A1 | 9/2017 | Tirronen et al. |
| 2019/0052440 | A1* | 2/2019 | Abrahamsson ....... H04L 1/1864 |
| 2020/0053797 | A1* | 2/2020 | Basu Mallick ... H04W 74/0833 |
| 2020/0100294 | A1* | 3/2020 | Chen .................... H04W 80/02 |
| 2020/0252958 | A1 | 8/2020 | Lu et al. |
| 2021/0282118 | A1 | 9/2021 | Zuo et al. |

FOREIGN PATENT DOCUMENTS

| | | |
|---|---|---|
| CN | 109495975 A | 3/2019 |
| CN | 109587769 A | 4/2019 |
| WO | 2018/064367 A1 | 4/2018 |
| WO | 2018/230995 A1 | 12/2018 |
| WO | WO-2020184954 A1 * | 9/2020 ........... H04L 1/0003 |

OTHER PUBLICATIONS

LG Electronics Inc., "4-step RACH procedure for NR-U", Agenda Item: 11.2.1.1 (NR_unlic-Core), 3GPP TSG-RAN WG2 Meeting #105, R2-1901754, (Revision of R2-1818100), Athens, Greece, Feb. 25-Mar. 1, 2019.

First Notification of Office Action and Search Report issued by the China National Intellectual Property Administration for corresponding Chinese Patent Application No. 201980095119.2, mailed on Oct. 26, 2023, with an English translation.

International Search Report and Written Opinion of the International Searching Authority issued by the China National Intellectual Property Administration for corresponding International Patent Application No. PCT/CN2019/085333, mailed on Jan. 16, 2020, with English translation.

3GPP TS 38.321 V15.5.0, 3rd Generation Partnership Project; Technical Specification Group Radio Access Network; NR; Medium Access Control (MAC) protocol specification (Release 15), Mar. 2019.

Second Notification of Office Action and Search Report issued by the China National Intellectual Property Administration for corresponding Chinese Patent Application No. 201980095119.2, mailed on Jun. 27, 2024, with an English translation.

* cited by examiner

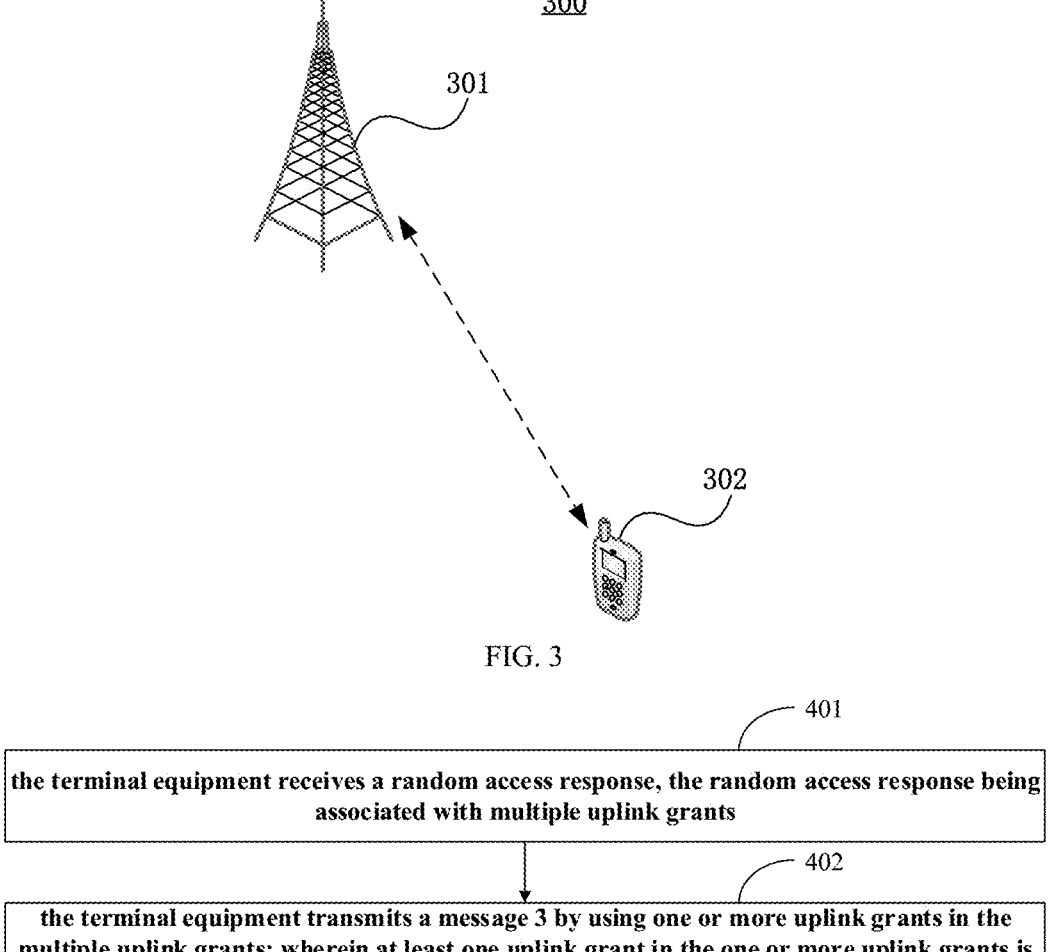

401 the terminal equipment receives a random access response, the random access response being associated with multiple uplink grants

402 the terminal equipment transmits a message 3 by using one or more uplink grants in the multiple uplink grants; wherein at least one uplink grant in the one or more uplink grants is used to transmit initial transmission of the message 3

FIG. 4

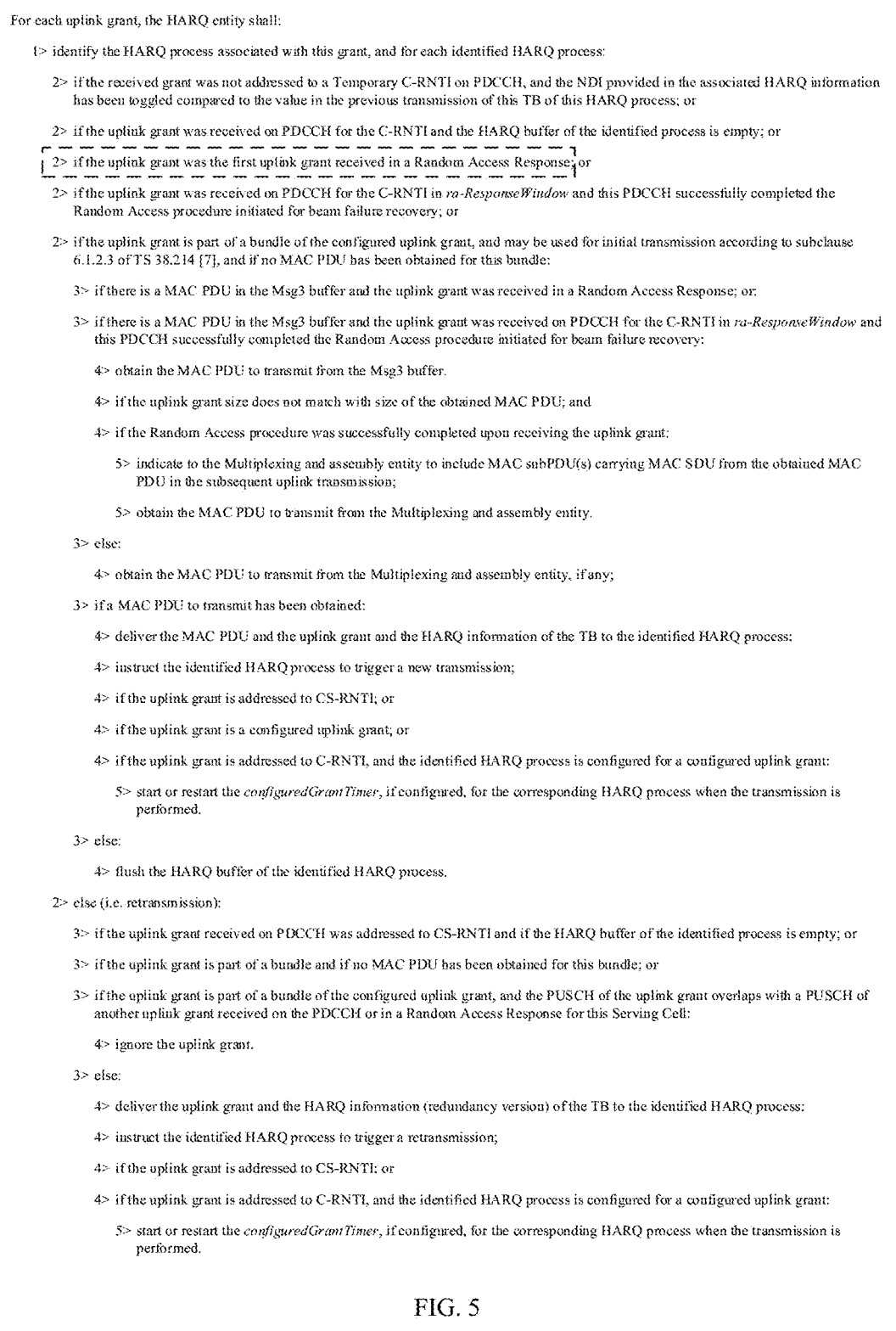

For each uplink grant, the HARQ entity shall:

1> identify the HARQ process associated with this grant, and for each identified HARQ process:

2> if the received grant was not addressed to a Temporary C-RNTI on PDCCH, and the NDI provided in the associated HARQ information has been toggled compared to the value in the previous transmission of this TB of this HARQ process; or 2> if the uplink grant was received on PDCCH for the C-RNTI and the HARQ buffer of the identified process is empty; or 2> if the uplink grant was the first uplink grant received in a Random Access Response; or 2> if the uplink grant was received on PDCCH for the C-RNTI in *ra-ResponseWindow* and this PDCCH successfully completed the Random Access procedure initiated for beam failure recovery; or 2> if the uplink grant is part of a bundle of the configured uplink grant, and may be used for initial transmission according to subclause 6.1.2.3 of TS 38.214 [7], and if no MAC PDU has been obtained for this bundle:

3> if there is a MAC PDU in the Msg3 buffer and the uplink grant was received in a Random Access Response; or:

3> if there is a MAC PDU in the Msg3 buffer and the uplink grant was received on PDCCH for the C-RNTI in *ra-ResponseWindow* and this PDCCH successfully completed the Random Access procedure initiated for beam failure recovery:

4> obtain the MAC PDU to transmit from the Msg3 buffer.

4> if the uplink grant size does not match with size of the obtained MAC PDU; and 4> if the Random Access procedure was successfully completed upon receiving the uplink grant:

5> indicate to the Multiplexing and assembly entity to include MAC subPDU(s) carrying MAC SDU from the obtained MAC PDU in the subsequent uplink transmission;

5> obtain the MAC PDU to transmit from the Multiplexing and assembly entity.

3> else:

4> obtain the MAC PDU to transmit from the Multiplexing and assembly entity, if any;

3> if a MAC PDU to transmit has been obtained:

4> deliver the MAC PDU and the uplink grant and the HARQ information of the TB to the identified HARQ process:

4> instruct the identified HARQ process to trigger a new transmission;

4> if the uplink grant is addressed to CS-RNTI; or

4> if the uplink grant is a configured uplink grant; or

4> if the uplink grant is addressed to C-RNTI, and the identified HARQ process is configured for a configured uplink grant:

5> start or restart the *configuredGrantTimer*, if configured, for the corresponding HARQ process when the transmission is performed.

3> else:

4> flush the HARQ buffer of the identified HARQ process.

2> else (i.e. retransmission):

3> if the uplink grant received on PDCCH was addressed to CS-RNTI and if the HARQ buffer of the identified process is empty; or 3> if the uplink grant is part of a bundle and if no MAC PDU has been obtained for this bundle; or 3> if the uplink grant is part of a bundle of the configured uplink grant, and the PUSCH of the uplink grant overlaps with a PUSCH of another uplink grant received on the PDCCH or in a Random Access Response for this Serving Cell:

4> ignore the uplink grant.

3> else:

4> deliver the uplink grant and the HARQ information (redundancy version) of the TB to the identified HARQ process:

4> instruct the identified HARQ process to trigger a retransmission;

4> if the uplink grant is addressed to CS-RNTI; or

4> if the uplink grant is addressed to C-RNTI, and the identified HARQ process is configured for a configured uplink grant:

5> start or restart the *configuredGrantTimer*, if configured, for the corresponding HARQ process when the transmission is performed.

FIG. 5

When the MAC entity is configured with multiple UL grants in Random Access Response, these UL grants are for transmissions of a TB within a bundle of the grant. The first UL grant is for the initial transmission and HARQ retransmissions follow within a bundle.

When the MAC entity is configured with *pusch-AggregationFactor* > 1, the parameter *pusch-AggregationFactor* provides the number of transmissions of a TB within a bundle of the dynamic grant. After the initial transmission, *pusch-AggregationFactor* − 1 HARQ retransmissions follow within a bundle.

When the MAC entity is configured with *repK* > 1, the parameter *repK* provides the number of transmissions of a TB within a bundle of the configured uplink grant. After the initial transmission, HARQ retransmissions follow within a bundle.

For both dynamic grant and configured uplink grant, bundling operation relies on the HARQ entity for invoking the same HARQ process for each transmission that is part of the same bundle.

Within a bundle, HARQ retransmissions are triggered without waiting for feedback from previous transmission according to *pusch-AggregationFactor* for a dynamic grant and *repK* for a configured uplink grant, respectively. Each transmission within a bundle is a separate uplink grant after the initial uplink grant within a bundle is delivered to the HARQ entity.

FIG. 6

| R | HARQ process ID |
|---|---|
| | TAC |
| TAC | UL Grant |
| UL Grant | |
| UL Grant | |
| UL Grant | |
| TC-RNTI | |
| TC-RNTI | |

FIG. 7

| R | R | R | I | HARQ process ID |
|---|---|---|---|---|
| E | T | | | RAPID |

FIG. 8

SIGNAL TRANSMISSION METHOD AND APPARATUS AND COMMUNICATION SYSTEM

CROSS-REFERENCE TO RELATED APPLICATION

This application is a continuation application of International Application PCT/CN2019/085333 filed on Apr. 30, 2019 and designated the U.S., the entire contents of which are incorporated herein by reference.

FIELD

This disclosure relates to the field of communications, and in particular to a signal transmission method and apparatus and a communication system.

BACKGROUND

In New Radio (NR), a contention-based random access (CBRA) procedure is shown in FIG. 1, which may also be referred to as 4-step random access, namely, step 1: a message 1 is transmitted by a terminal equipment to a network device, the message 1 at least containing a random access preamble; step 2: a message 2 is transmitted by the network device to the terminal equipment, the message 2 at least containing a random access response (RAR); step 3: a message 3 is transmitted by the terminal equipment to the network device, the message 3 at least containing a scheduled transmission; and step 4: a contention resolution message is transmitted by the network device to the terminal equipment, the contention resolution message at least containing contention resolution information.

FIG. 2 is a schematic diagram of transmission and contention resolution of message 3. As shown in FIG. 2, once message 3 is transmitted, a medium access control (MAC) entity will start a contention resolution timer (ra-ContentionResolutionTimer) at a first symbol after message 3 is transmitted, and restart the timer every time a message 3 of hybrid automatic repeat request (HARD) is retransmitted; while the timer is running, the terminal monitors a physical downlink control channel (PDCCH), regardless of a measurement interval that may occur.

If message 3 includes a C-RNTI MAC CE (C-RNTI refers to a cell radio network temporary identifier, and CE refers to a control element), that is, if the random access procedure is initiated for beam failure recovery and PDCCH transmission addressed to a C-RNTI is used, or if the random access procedure is initiated by a PDCCH order and PDCCH transmission addressed to a C-RNTI is used, or if the random access procedure is initiated by an MAC sublayer or an RRC (radio resource control) sublayer and PDCCH transmission addressed to a C-RNTI is used and includes a newly transmitted UL (uplink) grant, it is considered that the contention resolution is successful, and then the contention resolution timer is stopped; if message 3 includes a CCCH SDU (CCCH refers to a common control channel, and SDU refers to a service data unit) and PDCCH transmission is addressed to a TC-RNTI (temporary cell radio network temporary identifier), if an MAC PDU (protocol data unit) is successful in decoding, the contention resolution timer is stopped. And if the contention resolution timer expires, the TC-RNTI is discarded, and the contention resolution is considered as being unsuccessful.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that currently, 3GPP considers or is considering more transmission occasions for message 3, such as uplink repeat transmission in NR. In addition, in order to overcome possible failure of listen before talk (LBT) at a terminal side, transmission of message 3 needs to be enhanced. Current possible methods include:

method 1: message 3 in the time domain is repeated;

method 2: multiple grants are carried in an RAR;

method 3: multiple RARs may be received in the same RAR window; and method 4: the network configures the terminal to transmit message 3 in a COT of message 2 initiated by the network.

In the above methods, methods 1-3 are enhanced based on more transmission occasions. For example, in method 2 and method 3, the network provides the terminal with more uplink grants for transmission of message 3, thereby increasing possibilities of transmission of message 3.

However, how to process more uplink grants provided by the network and how to process pending UL grants when the contention resolution is unsuccessful are problems that need to be resolved.

In order to solve at least one of the above problems or other similar problems, embodiments of this disclosure provide a signal transmission method and apparatus and a system.

According to a first aspect of the embodiments of this disclosure, there is provided a signal transmission method, applicable to a terminal equipment, the method including:

the terminal equipment receives a random access response, the random access response being associated with multiple uplink grants; and the terminal equipment transmits a message 3 by using one or more uplink grants in the multiple uplink grants; wherein at least one uplink grant in the one or more uplink grants is used to transmit initial transmission of the message 3.

According to a second aspect of the embodiments of this disclosure, there is provided a signal transmission method, applicable to a network device, the method including:

the network device receives a random access preamble; and the network device transmits a random access response, the random access response being associated with multiple uplink grants, the multiple uplink grants being used for transmission of a message 3; wherein at least one uplink grant in the multiple uplink grants is used to transmit initial transmission of the message 3.

According to a third aspect of the embodiments of this disclosure, there is provided a signal transmission apparatus, configured in a terminal equipment, the apparatus comprising:

a receiving unit configured to receive a random access response, the random access response being associated with multiple uplink grants; and a transmitting unit configured to transmit a message 3 by using one or more uplink grants in the multiple uplink grants; wherein at least one uplink grant in the one or more uplink grants is used to transmit initial transmission of the message 3.

According to a fourth aspect of the embodiments of this disclosure, there is provided a signal transmission apparatus, configured in a network device, the apparatus comprising:

a receiving unit configured to receive a random access preamble; and a first transmitting unit configured to transmit a random access response, the random access response being associated with multiple uplink grants, the multiple uplink grants being used for transmission of a message 3; wherein at least one uplink grant in the multiple uplink grants is used for initial transmission of the message 3.

According to a fifth aspect of the embodiments of this disclosure, there is provided a terminal equipment, including the apparatus as described in the third aspect.

According to a sixth aspect of the embodiments of this disclosure, there is provided a network device, including the apparatus as described in the fourth aspect.

According to a seventh aspect of the embodiments of this disclosure, there is provided a communication system, including the network device as described in the sixth aspect and the terminal equipment as described in the fifth aspect.

According to another aspect of the embodiments of this disclosure, there is provided a computer readable program, which, when executed in a terminal equipment, will cause a computer to carry out the method described in the first aspect in the terminal equipment.

According to a further aspect of the embodiments of this disclosure, there is provided a storage medium storing a computer readable program, which will cause a computer to carry out the method described in the first aspect in a terminal equipment.

According to yet another aspect of the embodiments of this disclosure, there is provided a computer readable program, which, when executed in a network device, will cause a computer to carry out the method described in the second aspect in the network device.

According to still another aspect of the embodiments of this disclosure, there is provided a storage medium storing a computer readable program, which will cause a computer to carry out the method described in the second aspect in a network device.

An advantage of the embodiments of this disclosure exists in that according to at least aspect of the embodiments of this disclosure, in a case where occasions of transmission of a message 3 are increased, transmission of the message 3 is ensured, and uplink grants to which the message 3 corresponds are processed.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 3 is a schematic diagram of a communication system of an embodiment of this disclosure;

FIG. 4 is a schematic diagram of the signal transmission method of Embodiment 1;

FIG. 5 is a schematic diagram of description manner in initial transmission of message 3 in a standard;

FIG. 6 is a schematic diagram of description of a UL grant in an RAR in a standard;

FIG. 7 is a schematic diagram of an RAR format;

FIG. 8 is a schematic diagram of an MAC subheader format;

DETAILED DESCRIPTION

Figures 1, 2:
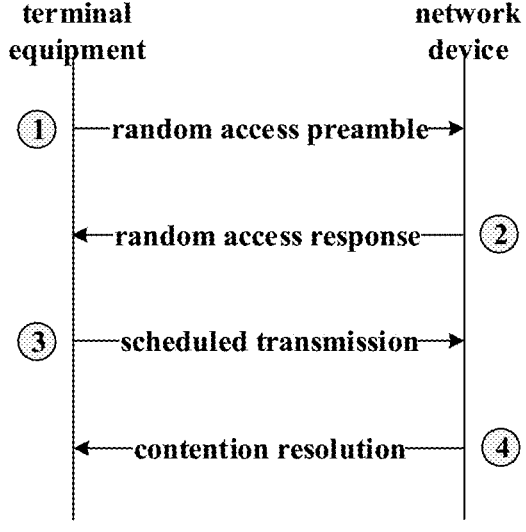
FIG. 1 is schematic diagram of 4-step random access.
FIG. 2 is a schematic diagram of transmission and contention resolution of message 3 in 4-step random access.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" refers to, for example, an equipment accessing to a communication network and receiving network services via a network device, and may also be referred to as a "terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios in the embodiments of this disclosure shall be described below by way of examples; however, this disclosure is not limited thereto.

FIG. 3 is a schematic diagram of a communication system of an embodiment of this disclosure, in which a case where terminal equipments and a network device are taken as examples is schematically shown. As shown in FIG. 3, the communication system 300 may include a network device 301 and a terminal equipment 302. For the sake of simplicity, an example having only one terminal equipment is schematically given in FIG. 3. The network device 301 is, for example, a network device gNB in an NR system.

In the embodiment of this disclosure, existing traffics or traffics that may be implemented in the future may be performed between the network device 301 and the terminal equipment 302. For example, such traffics may include but not limited to enhanced mobile broadband (eMBB), massive machine type communication (MTC), and ultra-reliable and low-latency communication (URLLC), etc.

The terminal equipment 302 may transmit data to the network device 301, for example, in a grant-free transmission mode. The network device 301 may receive data transmitted by one or more terminal equipments 302, and feed back information (such as acknowledgement ACK information/non-acknowledgement NACK information) to the terminal equipment 302, and the terminal equipment 302 may acknowledge terminating a transmission process, or may further perform new data transmission, or may perform data retransmission, according to the feedback information.

Various implementations of this disclosure shall be described below with reference to the accompanying drawings. These implementations are illustrative only, and are not intended to limit this disclosure.

Embodiment 1

The embodiment of this disclosure provides a signal transmission method, applicable to a terminal equipment, such as the terminal equipment 302 shown in FIG. 3.

FIG. 4 is a schematic diagram of the signal transmission method of this embodiment. Referring to FIG. 4, the method includes:

step 401: the terminal equipment receives a random access response (RAR), the random access response being associated with multiple uplink grants (UL grants); and step 402: the terminal equipment transmits a message 3 by using one or more uplink grants in the multiple uplink grants; wherein at least one uplink grant in the one or more uplink grants is used to transmit initial transmission of the message 3.

In this embodiment, when a network device provides multiple UL grants, the terminal equipment uses at least one of the UL grants to transmit the initial transmission of message 3, thereby ensuring transmission of message 3.

In this embodiment, the above at least one UL grant may be a grant in a first received RAR, or may be a first grant in the first received RAR, or a grant in uplink grants included in the RAR and coming first temporally, that is, a first available grant.

In this embodiment, the above RAR is associated with multiple UL grants, which may be that one RAR is associated with one UL grant, and the terminal equipment receives multiple RARs within an RAR receive window; or, the above RAR is associated with multiple UL grants may also be that one RAR is associated with multiple UL grants, and the terminal equipment receives one RAR within the RAR receive window.

In an implementation, the terminal equipment transmit message 3 by using the above multiple UL grants, wherein a first UL grant in the multiple UL grants is used to transmit initial transmission of the message 3, and a second UL grant in the multiple UL grants is used to transmit retransmission of the message 3. The first UL grant may be a grant in a first received RAR, or a first grant in the first received RAR, or a grant in uplink grants included in the RAR and coming first temporally, that is, a first available grant, and the second UL grant refers to a UL grant other than the first UL grant in multiple UL grants.

Based on the method of this implementation, if the terminal equipment receives an RAR in the RAR receive window and the RAR is associated with multiple UL grants, a description "if the uplink grant was received in a Random Access Response" in an existing standard may be modified into "if the uplink grant was the first uplink grant received in a Random Access Response"; and if the terminal equipment receives multiple RARs in the RAR receive window and each RAR is associated with a UL grant, the above description in the existing standard may be modified into "if the uplink grant was the first uplink grant received in Random Access Responses". FIG. 5 shows a possible description in the standard, wherein the content in the dashed box is a modified part made according to this implementation. As mentioned above, this part of content may also be modified into "if the uplink grant was the first uplink grant received in Random Access Responses".

Based on the method of this implementation, the above multiple UL grants may also be regarded as a bundle. Therefore, the description of UL grants in the RAR in the existing standard may be added, for example, "When the MAC entity is configured with multiple UL grants in Random Access Response, these UL grants are for transmissions of a TB within a bundle of the grant. The first UL grant is for the initial transmission and HARQ retransmissions follow within a bundle." FIG. 6 shows a possible description in the standard, wherein the content in the dashed box is an added part made according to this implementation.

In another implementation, the terminal equipment transmits message 3 by using the above multiple UL grants, wherein a first UL grant in the multiple UL grants is used for the initial transmission of message 3, and a second UL grant in the multiple UL grants grant is also used for the initial transmission of message 3.

In this implementation, priorities between the initial transmission of message 3 and the retransmission of message 3 performed by using the multiple UL grants may be that a priority of message 3 obtained later is higher, or it may be that a priority of the initial transmission of message 3 is higher than a priority of the retransmission of message 3. Here, 'obtained later' refers to being late temporally, that is, when there exists a conflict between a UL grant corresponding to dynamically scheduled retransmission to which the first UL grant included in the RAR corresponds and the second UL grant included in the RAR, a HARQ process may instruct a physical layer to generate transmission according to the UL grant obtained later.

In this embodiment, the above conflict may also be avoided by a network device (such as a smart gNB). For example, the network device may avoid the conflict between the UL grant corresponding to dynamically scheduled retransmission to which the first UL grant included in the RAR corresponds and the second UL grant included in the RAR by scheduling.

In this implementation, each UL grant may correspond to an HARQ process ID, the terminal equipment may transmit the initial transmission of message 3 according to an HARQ process ID to which each UL grant corresponds, and the HARQ process to which each UL grant corresponds may be included in the above RAR, or may be pre-configured, or may be obtained through calculation by the terminal equipment. Furthermore, in order to avoid collision with a configured grant (CG), HARQ process IDs may be distinguished by ranges. For example, the CG uses HARQ process IDs 4~7, and message 3 uses HARQ process IDs 0~3; however, these are examples only, and this embodiment is not limited thereto. In this embodiment, the above "corresponding" may also be "association", and all of them are collectively referred to as "corresponding" for the convenience of description.

In this implementation, the HARQ process IDs to which the UL grants correspond may be included in the above RAR.

For example, a RAR format may be modified so that the RAR includes an HARQ process ID to which a corresponding UL grant corresponds. FIG. 7 is a schematic diagram of the RAR format. As shown in FIG. 7, the RAR format includes not only a UL grant, but also an HARQ process ID. Furthermore, in FIG. 7, reference may be made to the related art for meanings of R and TAC. For example, the above HARQ process ID may be indicated by some bits of the UL grant included in the RAR. For example, for a UL grant of 27 bits, 4 bits may be used to indicate an HARQ process ID to which it corresponds.

For another example, the HARQ process IDs to which the UL grants correspond may also be indicated by an MAC subheader. FIG. 8 is a schematic diagram of the MAC subheader. As shown in FIG. 8, the MAC subheader indicates an HARQ process ID. Moreover, in FIG. 8, I is used to indicate whether the subheader is 1 byte or 2 bytes, and reference may be made to the related art for meanings of R, E, T and RAPID. The above two indication modes in FIG. 7 and FIG. 8 are examples only, and these two modes may also be used in a combined manner.

In this implementation, the process IDs of the UL grants may be pre-configured.

For example, it is provided in the standards that HARQ process IDs 0~A are used for transfer of message 3, A may be an integer greater than 0 and less than 16.

For another example, the network device configures a group of HARQ process IDs for transmission of message 3, in which 0 may or may not be included; when the number of configured process IDs is identical to the number of UL grants in the RAR, they correspond one to one; and when the number of UL grants is greater than the number of configured process IDs, the HARQ process IDs may be used sequentially and cyclically, or may be mapped according to a certain rule. For example, UL grants with time starting positions at identical symbols or slots use identical HARQ process IDs.

In this implementation, the above pre-configuration may be implemented via a broadcast message and/or via an RRC-specific message, information configured by the RRC-specific message may cover information in the broadcast message.

In this implementation, the process IDs of the UL grants may also be obtained through calculation by the terminal equipment. For example, the terminal equipment may calculate the HARQ process IDs of the UL grants based on a formula as follows:

$$\text{HARQ Process ID}=\text{offset}+[\text{floor(CURRENT\_symbol)}]\text{modulo nrofMsg3};$$

where, CURRENT_symbol is a symbol index of a first transmission time of an uplink grant in the RAR, CURRENT_symbol=(SFN×numberOfSlotsPerFrame×numberOfSymbolsPerSlot+slot number in the frame×numberOfSymbolsPerSlot+symbol number in the slot), nrofMsg3 denotes a maximum number of available HARQ processes for transmission of message 3, which may be predefined, such as 3 or 2, or may be configured by the network, or may be the number of RARs in the RAR receive window or the number of UL grants in the RAR, and offset is an offset, which is used to be distinguished from the HARQ process ID of the configured UL grant.

With the above implementation of this embodiment, the problem of how to use multiple uplink grants provided by the network device to transmit message 3 is solved.

In this embodiment, the terminal equipment may also transmit message 3 by using at least one of the above multiple UL grants. And unused UL grants may be discarded or may continue to be used, which shall be described below respectively.

In an implementation, the terminal equipment receives a contention resolution message, and decodes the contention resolution message to obtain an MAC PDU. If the MAC PDU contains a contention resolution identity (ID) and the contention resolution ID does not match a contention resolution ID contained or transmitted in message 3, the terminal equipment considers that the contention resolution is unsuccessful, and discards pending or remaining or allocated UL grants received in the RAR.

In this implementation, if the contention resolution is unsuccessful, in addition to the UL grants received in the RAR, similar to the related art, the terminal equipment may also discard a TC-RNTI received in the RAR, and discard an MAC PDU that is successfully decoded.

In this implementation, if the contention resolution is unsuccessful, in addition to the above UL grants received in the RAR, unlike the related art, the terminal equipment may discard a dynamically scheduled UL grant, such as a UL grant used for the retransmission of message 3.

In this implementation, 'discard' may also be replaced with 'release', and 'considered unavailable', etc. In addition, in this embodiment, identical expressions have identical meanings, which shall not be described herein any further.

In this implementation, for the unused UL grants, if they are continued to be used, multiple terminal equipments may use identical TC-RNTIs to address PDCCHs, which may result in that multiple terminal equipments are successful in competition, that is, a multi-contention resolution solution.

In an implementation, a condition that the contention resolution is considered as being unsuccessful is identical to those in the previous implementation, with a difference being behaviors of the MAC entity of the terminal equipment, that is, the terminal equipment receives the contention resolution message and decodes the contention resolution message to obtain the MAC PDU, if the MAC PDU contains the contention resolution ID and the contention resolution ID does not match a contention resolution ID contained or transmitted in message 3, the terminal equipment considers that the contention resolution is unsuccessful.

In this implementation, if the contention resolution is unsuccessful and there exists an uplink grant available for transmitting message 3, the MAC entity of the terminal equipment uses the available uplink grant to transmit message 3 instead of discarding the UL grant received in the RAR. In addition, the terminal equipment may continue to monitor the PDCCH so as to receive the contention resolution message.

In this implementation, if the contention resolution is unsuccessful and there exists no UL grant available for transmitting message 3, the MAC entity of the terminal equipment may perform current behaviors when contention resolution is unsuccessful, that is, performing at least one of the following behaviors: clearing an HARQ buffer used for transmission of an MAC PDU in a buffer of message 3; adding 1 to a preamble transmission counter; indicating a random access problem to upper layers if the counter reaches a maximum value+1, and considering that the random access procedure is completed but is unsuccessful if the random access procedure is triggered for a system information request; and returning to a random access resource selection process if the random access process is not completed.

In this implementation, the terminal equipment does not discard the TC-RNTI received in the RAR when a condition that the contention resolution is considered as being unsuccessful is satisfied. Thus, the terminal equipment may use a stored TC-RNTI to scramble message 3 to be transmitted, and use the stored TC-RNTI to address the PDCCH to receive possible contention resolution messages.

In another implementation, the conditions for unsuccessful contention resolution are modified, and corresponding behaviors of the MAC entity of the terminal equipment remain unchanged, that is, if there is no UL grant available for transmitting message 3 and the contention resolution timer expires or a first timer expires, the terminal equipment discards the TC-RNTI, considers that the contention resolution is unsuccessful, and discards the MAC PDU that is successfully decoded.

In this implementation, the condition of 'the contention resolution timer expires or a first timer expires' is optional, that is, it may also be that if there exists no UL grant available for transmitting message 3, the terminal equipment discards the TC-RNTI, considers that the contention resolution is unsuccessful and discards the MAC PDU that is successfully decoded.

In this implementation, the first timer may be a timer used by the terminal equipment to monitor the contention resolution message, that is, the terminal equipment may monitor the contention resolution message during running of the first timer, and perform another time of transmission or transmission attempt of message 3 when the first timer expires. A name of the first timer is not limited in this embodiment.

In this embodiment, for a multi-contention resolution solution, the terminal equipment may continue to monitor the PDCCH addressed to the current TC-RNTI.

For example, the above multiple UL grants are located at a licensed frequency band (NR licensed) or an unlicensed frequency band (NR unlicensed, NR-U), the MAC entity of the terminal equipment may start or restart the contention resolution timer after the end of a transmission or retransmission occassion of message 3; if message 3 includes a CCCH SDU and the TC-RNTI is used to address the PDCCH transmission, if a MAC PDU is successfully decoded, if the MAC PDU contains a contention resolution ID and the contention resolution ID matches a contention resolution ID transmitted in message 3, the terminal equipment stops the contention resolution timer, that is, the contention resolution is successful. This implementation may be used in combination with the previous implementations, or may be used separately.

For another example, the above multiple UL grants are located at an unlicensed frequency band, the MAC entity of the terminal equipment may start the contention resolution timer when LBT of transmission of message 3 is successful; if all the transmissions of message 3 fail and/or the contention resolution timer expires, the MAC entity of the terminal equipment restarts from the random access resource selection process or indicates the random access problem to upper layers.

In this example, a new timer (called a first timer) may also be introduced. As described above, the MAC entity of the terminal equipment starts the first timer after the end of a transmission or retransmission occasion of message 3, regardless of LBT result of message 3, and monitors the contention resolution message during running of the first timer. Optionally, it may also monitor scheduling information of HARQ retransmission of message 3, and when the first timer expires, the terminal equipment allows transmission of message 3. Therefore, frequent transmission of message 3 may be avoided, and power consumption of the terminal equipment may be saved. Here, HARQ retransmission of message 3 may be replaced with "a PDCCH addressed to a specific TC-RNTI", the specific TC-RNTI referring to one that is stored by the terminal equipment itself, or one allocated by the received RAR for the terminal equipment itself.

In this implementation, 'transmission', that is, 'transmitting by the terminal equipment', may be replaced with "a transmission attempt" or generating a TB by MAC. The transmission attempt may possibly fail due to LBT failure or power control. Here, as the MAC entity is directed to an uplink grant, there will be a message 3 initial transmission or a message 3 retransmission, and then a TB is generated, and thereafter, the physical layer is instructed to transmit. Therefore, the above 'transmission' may also be replaced with "generating a TB by MAC".

In this embodiment, for the multi-contention resolution solution, the contention resolution message may further include a new C-RNTI. In a case where the contention is successful and the TC-RNTI is occupied by another terminal equipment, the terminal equipment may use the C-RNTI as its own C-RNTI to address the PDCCH.

With the method of this embodiment, the terminal equipment may reasonably process multiple uplink grants provided by the network device, thereby improving reliability of the random access.

Embodiment 2

The embodiment of this disclosure provides a signal transmission method, applicable to a network device. This method is processing at a network device side corresponding to the method of Embodiment 1, and contents identical to those in Embodiment 1 shall not be described herein any further.

Figure 9:
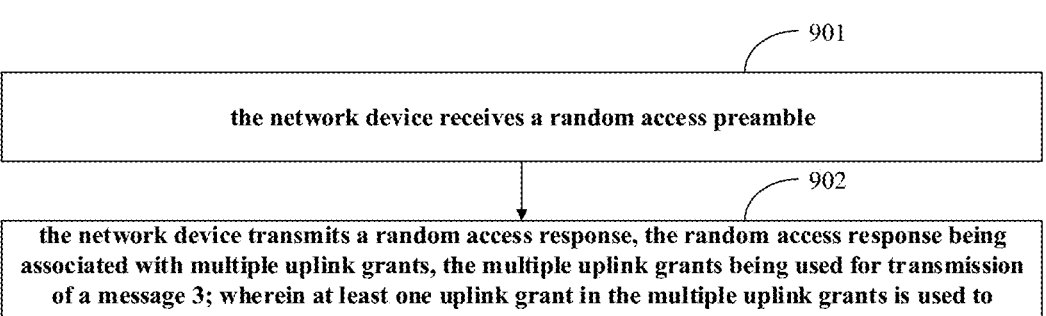
FIG. 9 is a schematic diagram of the signal transmission method of Embodiment 2.

FIG. 9 is a schematic diagram of the signal transmission method of this embodiment. As shown in FIG. 9, the method includes:

step 901: the network device receives a random access preamble (RA preamble); and step 902: the network device transmits a random access response (RAR), the random access response being associated with multiple uplink grants (UL grants), the multiple uplink grants being used for transmission of a message 3; wherein at least one uplink grant in the multiple uplink grants is used to transmit initial transmission of the message 3.

In this embodiment, as described in Embodiment 1, that the above RAR is associated with multiple UL grants refers to that an RAR is associated with a UL grant, and the network device transmits multiple RARs within the RAR receive window; or, an RAR is associated with multiple UL grants, and the network device transmits one or more RARs within the RAR receive window, which shall not be described herein any further.

In an implementation, as described in Embodiment 1, the first UL grant in the multiple UL grants is used for the initial transmission of message 3, and the second UL grant in the multiple UL grants is used for the retransmission of message 3.

In another implementation, as described in Embodiment 1, the first UL grant in the multiple UL grants is used for the initial transmission of message 3, and the second UL grant in the multiple UL grants is also used for the initial transmission of message 3.

In this implementation, the second UL grant and a UL grant corresponding to the retransmission of message 3 to which the first UL grant corresponds may occupy different time-domain resources. Therefore, a conflict between a UL grant corresponding to dynamically scheduled retransmission to which the first UL grant included in the RAR corresponds and the second UL grant included in the RAR may be avoided.

Meanings of the first UL grant and the second UL grant are identical to those in Embodiment 1, and shall not be described herein any further.

In this implementation, as described in Embodiment 1, the above RAR may include an HARQ process ID to which the UL grant corresponds, and the HARQ process to which HARQ process ID corresponds is used for transmission of message 3 to which the UL grant corresponds.

In this implementation, as described in Embodiment 1, the network device may further transmit configuration information. The configuration information configures the HARQ process ID to which the UL grant corresponds, if the number of HARQ process IDs is identical to the number of the multiple UL grants, the HARQ process IDs and the multiple UL grants may correspond one-to-one, and if the number of the HARQ process IDs is less than the number of the multiple UL grants, the HARQ process IDs and the multiple UL grants may 'map' to each other according to a predetermined rule. The 'mapping' here may also mean 'corresponding'.

In this embodiment, the network device may also monitor message 3 on one UL grant in the multiple UL grants; if message 3 is received and the message 3 includes a first contention resolution ID, the network device may transmit a contention resolution message. The contention resolution message includes a second contention resolution ID, the second contention resolution ID being identical to a first contention resolution ID included in message 3. The above 'monitoring' may also be 'receiving' or 'trying to receive'. For the convenience of description, they are described as 'monitoring' in this embodiment. In the following description, identical expressions have identical meanings.

In an implementation, after receiving message 3, the network device may stop monitoring message 3 on a pending or remaining or allocated UL grant in the multiple UL grants. And furthermore, the network device may also stop monitoring message 3 on a dynamically scheduled UL grant.

In another implementation, after receiving message 3, the network device may further use the pending or remaining or allocated UL grant in the multiple UL grants for data transmission. Here, the data transmission includes receiving, and scheduling the terminal equipment to transmit signals, etc.

In another implementation, after receiving message 3, if there exists a pending or remaining or allocated first UL grant in the multiple UL grants, the network device may also monitor message 3 on the first UL grant; if message 3 is received and the message 3 includes the first contention resolution ID, the network device may also transmit a contention resolution message, the contention resolution message including a second contention resolution ID, the second contention resolution ID being identical to the first contention ID included in message 3.

In a further implementation, after receiving message 3, if there exists a pending or remaining or allocated first UL grant in the multiple UL grants and the second timer is running, the network device monitors message 3 on the first UL grant; and if message 3 is received and the message 3 includes the first contention resolution ID, the network device transmits a contention resolution message, the contention resolution message including the second contention resolution ID, the second contention resolution ID being identical to the first contention resolution ID included in message 3.

In still another implementation, after receiving message 3, if there is no pending or remaining or allocated first UL grant in the multiple UL grants, the network device may stop monitoring message 3; or, if the second timer expires, the network device may stop monitoring message 3 on the first UL grant.

In this embodiment, the network device may run the second timer, and a duration of the second timer is identical to that of the contention resolution timer.

In this embodiment, the network device may further run a first timer; when the network device receives message 3, it may start the first timer, and transmits a contention resolution message while the first timer is running; or the network device starts the first timer at the end of a transmission or retransmission occasion of message 3, and the network device transmits scheduling information of HARQ retransmission of message 3 while the first timer is running; and when the first timer expires, the network device starts to receive transmission of message 3. The first timer has been described in Embodiment 1, and shall not be described herein any further.

In this embodiment, the above contention resolution message may further include a C-RNTI, which may be used to identify the terminal equipment.

With the method of this embodiment, the terminal equipment may reasonably process multiple uplink grants provided by the network device, thereby improving reliability of the random access.

Embodiment 3

The embodiment of this disclosure provides a signal transmission apparatus, which is configured in a terminal equipment. As principles of the apparatus for solving problems are similar to those of the method of Embodiment 1, reference may be made to implementations of the method in Embodiment 1 for implementation of this apparatus, with identical parts being not going to be described herein any further.

Figure 10:
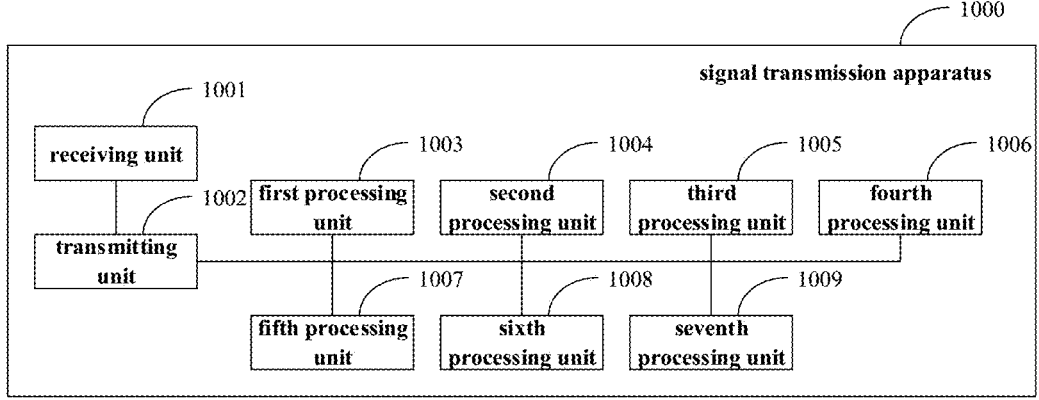
FIG. 10 is a schematic diagram of the signal transmission apparatus of Embodiment 3.

FIG. 10 is a schematic diagram of the signal transmission apparatus of this embodiment. As shown in FIG. 10, the apparatus 1000 includes:

a receiving unit 1001 configured to receive a random access response, the random access response being associated with multiple uplink grants; and a transmitting unit 1002 configured to transmit a message 3 by using one or more uplink grants in the multiple uplink grants; wherein at least one uplink grant in the one or more uplink grants is used to transmit initial transmission of the message 3.

In this embodiment, the random access response being associated with multiple uplink grants refers to that the receiving unit 1001 receives multiple random access responses in a time window to receive random access response(s), an uplink grant being associated per random access response, or the receiving unit 1001 receives a random access response in a time window to receive random access response(s), multiple uplink grants being associated with the random access response.

In an implementation of this embodiment, the transmitting unit 1002 transmits message 3 by using the multiple uplink grants; wherein a first uplink grant in the multiple uplink grants is used to transmit an initial transmission of message 3, and a second uplink grant in the multiple uplink grants is used to transmit a retransmission of message 3.

In another implementation of this embodiment, the transmitting unit 1002 transmits message 3 by using the multiple uplink grants; wherein the first uplink grant in the multiple uplink grants is used for initial transmission of message 3, and the second uplink grant in the multiple uplink grants is also used for the initial transmission of message 3.

In this implementation, a relationship between a priority of the initial transmission of message 3 and a priority of the retransmission of message 3 is: a priority of a message 3 obtained later is higher; or, a priority of the initial transmission of message 3 is higher than a priority of the retransmission of message 3.

In this implementation, each uplink grant corresponds to a process ID, and the transmitting unit 1002 transmits the initial transmission of message 3 according to process ID to which the uplink grant corresponds, the process ID to which the uplink grant corresponds being contained in the random access response, or being pre-configured, or being obtained by the terminal equipment through calculation.

In a further implementation of this embodiment, the transmitting unit 1002 transmits message 3 by using at least one of the multiple uplink grants; and as shown in FIG. 10, the apparatus 1000 further includes:

a first processing unit 1003 configured to receive a contention resolution message, and obtain an MAC PDU by decoding the contention resolution message; wherein, if the MAC PDU contains a contention resolution ID and the contention resolution ID does not match a contention resolution ID contained or transmitted in the message 3, it is considered that the contention resolution is unsuccessful, and pending or remaining or allocated uplink grants received in the random access response are discarded.

In this implementation, when it is considered that the contention resolution is unsuccessful, the first processing unit 1003 further discards a dynamically scheduled uplink grant.

In yet another implementation of this embodiment, the transmitting unit 1002 transmits message 3 by using at least one of the multiple uplink grants; and as shown in FIG. 10, the apparatus 1000 further includes:

a second processing unit 1004 configured to receive a contention resolution message, and obtain an MAC PDU by decoding the contention resolution message; wherein, if the MAC PDU contains a contention resolution ID and the contention resolution ID does not match a contention resolution ID contained or transmitted in the message 3, it is considered that the contention resolution is unsuccessful.

In this implementation, if the contention resolution is unsuccessful and there exists an uplink grant available for transmitting the message 3, the second processing unit 1004 transmits the message 3 by using the available uplink grant.

In this implementation, if the contention resolution is unsuccessful and there exists no uplink grant available for transmitting the message 3, the second processing unit 1004 performs at least one of the following behaviors: clearing an HARQ buffer used for transmission of an MAC PDU in a buffer of the message 3; adding 1 to a preamble transmission counter; indicating a random access problem to upper layers if the counter reaches a maximum value+1, and considering that the random access procedure is completed but is unsuccessful if the random access procedure is triggered for a system information request; and returning to a random access resource selection process if the random access process is not completed.

In this implementation, if the contention resolution is unsuccessful, the second processing unit 1004 does not discard a TC-RNTI received in the random access response.

In yet still another implementation of this embodiment, the transmitting unit 1002 transmits message 3 by using at least one of the multiple uplink grants; and as shown in FIG. 10, the apparatus 1000 further includes:

a third processing unit 1005 configured to, if there exists no uplink grant available for transmitting the message 3 and a contention resolution timer expires or a first timer expires, discard a TC-RNTI received in the random access response, consider that the contention resolution is unsuccessful, and discard a successfully decoded MAC PDU.

In an implementation of this embodiment, the transmitting unit 1002 transmits message 3 by using at least one of the multiple uplink grants; and as shown in FIG. 10, the apparatus 1000 further includes:

a fourth processing unit 1006 configured to, if there exists no uplink grant available for transmitting the message 3, discard the TC-RNTI received in the random access response, consider that the contention resolution is unsuccessful, and discard the MAC PDU that is successfully decoded.

In an implementation of this embodiment, the multiple uplink grants are located in a licensed frequency band or an unlicensed frequency band; and as shown in FIG. 10, the apparatus 1000 further includes:

a fifth processing unit 1007 configured to start or restart a contention resolution timer after the end of a transmission or retransmission occassion of message 3;

wherein if a CCCH SDU is included in message 3 and PDCCH transmission is addressed to a TC-RNTI, and if a MAC PDU is successfully decoded, the MAC PDU contains a contention resolution ID and the contention resolution ID matches a contention resolution ID transmitted in the message 3, the fifth processing unit 1007 stops the contention resolution timer.

In an implementation of this embodiment, the multiple uplink grants are located in an unlicensed frequency band; and as shown in FIG. 10, the apparatus 1000 further includes:

a sixth processing unit 1008 configured to start the contention resolution timer when LBT of transmission of message 3 is successful;

wherein if all transmissions of message 3 fail and/or the contention resolution timer expires, the sixth processing unit 1008 restarts from the random access resource selection process or indicates the random access problem to upper layers.

In an implementation of this embodiment, as shown in FIG. 10, the apparatus 1000 further includes:

a seventh processing unit 1009 configured to start a first timer after the end of a transmission or retransmission occasion of message 3, monitor a contention resolution message while the first timer is running, monitor scheduling information of HARQ retransmission of the message 3, and allow transmission or transmission attempts of message 3 when the first timer expires.

In this embodiment, the contention resolution message may include a C-RNTI, and the terminal equipment may use the C-RNTI as its own C-RNTI.

With the apparatus of this embodiment, the terminal equipment may reasonably process multiple uplink grants provided by the network device, thereby improving reliability of the random access.

Embodiment 4

The embodiment of this disclosure provides a signal transmission apparatus, configured in a network device. As principles of the apparatus for solving problems are similar to those of the method of Embodiment 2, reference may be made to implementations of the method in Embodiment 2 for implementation of this apparatus, with identical parts being not going to be described herein any further.

Figure 11:
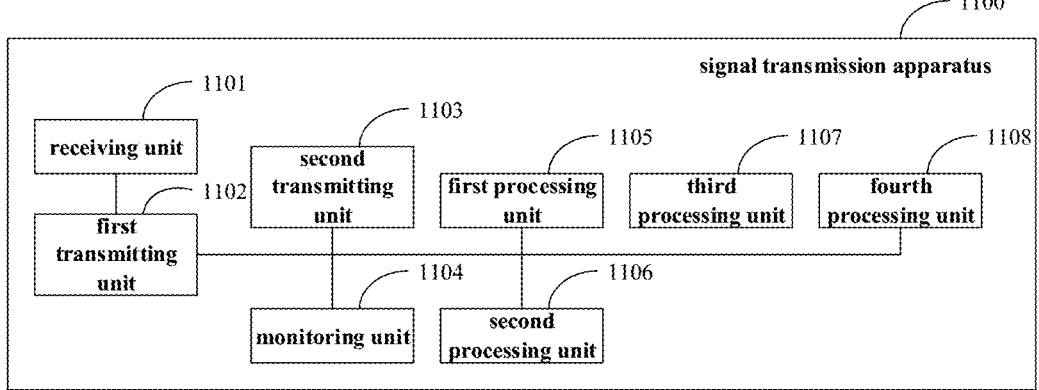
FIG. 11 is a schematic diagram of the signal transmission apparatus of Embodiment 4.

FIG. 11 is a schematic diagram of the signal transmission apparatus 1100 of this embodiment. As shown in FIG. 11, the apparatus 1100 includes:

a receiving unit 1101 configured to receive a random access preamble; and a first transmitting unit 1102 configured to transmit a random access response, the random access response being associated with multiple uplink grants, the multiple uplink grants being used for transmission of a message 3; wherein at least one uplink grant in the multiple uplink grants is used for initial transmission of the message 3.

In this embodiment, the random access response being associated with multiple uplink grants refers to that one random access response is associated with one uplink grant, and the network device transmits multiple random access responses in a time window to receive random access response(s); or one random access response is associated with multiple uplink grants.

In an implementation, the multiple uplink grants are used for transmission of message 3; wherein a first uplink grant in the multiple uplink grants is used for initial transmission of the message 3, and a second uplink grant in the multiple uplink grants is used for retransmission of the message 3.

In another implementation, the multiple uplink grants are used for transmission of message 3; wherein a first uplink grant in the multiple uplink grants is used for the initial transmission of message 3, and a second uplink grant in the multiple uplink grants is also used for the initial transmission of message 3.

In this implementation, the second uplink grant and a UL grant corresponding to the retransmission of message 3 to which the first UL grant corresponds may occupy different time-domain resources.

In this implementation, the random access response may include HARQ process IDs to which the uplink grants correspond, and HARQ processes to which the HARQ process IDs correspond are used for transmission of the message 3 to which the uplink grants correspond.

In this implementation, as shown in FIG. 11, the apparatus 1100 may further include:

a second transmitting unit 1103 configured to transmit configuration information, the configuration information configuring the HARQ process ID to which the uplink grant corresponds, if the number of HARQ process IDs is identical to the number of the multiple uplink grants, the HARQ process IDs and the multiple uplink grants may correspond one-to-one, and if the number of the HARQ process IDs is less than the number of the multiple uplink grants, the HARQ process IDs and the multiple uplink grants may map to each other according to a predetermined rule.

In this implementation, as shown in FIG. 11, the apparatus 1100 may further include:

a monitoring unit 1104 configured to monitor the message 3 on one of the multiple uplink grants;

wherein if the message 3 is received and the message 3 includes a first contention resolution ID, the first transmitting unit 1102 transmits a contention resolution message, the contention resolution message including a second contention resolution ID, and the second contention resolution ID being identical to the first contention resolution ID contained in the message 3.

In an example, as shown in FIG. 11, the apparatus 1100 may further include:

a first processing unit 1105 configured to stop monitoring messages 3 on pending or remaining or allocated uplink grants in the multiple uplink grants. Alternatively, the first processing unit 1105 may stop monitoring messages 3 on a dynamically scheduled uplink grant.

In another example, as shown in FIG. 11, the apparatus 1100 may further include:

a second processing unit 1106 configured to performing data transmission by using the pending or remaining or allocated uplink grant in the multiple uplink grants.

In another example, if there exists a pending or remaining or allocated first uplink grant in the multiple uplink grants, the monitoring unit 1104 may monitor the message 3 on the first uplink grant; and if the message 3 is received and the message 3 includes a first contention resolution ID, the first transmitting unit 1102 may transmit a contention resolution message, the contention resolution message including a second contention resolution ID, and the second contention resolution ID being identical to the first contention resolution ID contained in the message 3.

In a further example, if there exists a pending or remaining or allocated first uplink grant in the multiple uplink grants, and a second timer is running, the monitoring unit 1104 may monitor the message 3 on the first uplink grant; and if the message 3 is received and the message 3 includes a first contention resolution ID, the first transmitting unit 1102 may transmit a contention resolution message, the contention resolution message including a second contention resolution ID, and the second contention resolution ID being identical to the first contention resolution ID contained in the message 3.

In still another example, if the multiple uplink grants have no pending or remaining or allocated first uplink grant, the monitoring unit 1104 may stop monitoring message 3; or if the second timer expires, the monitoring unit 1104 may stop monitoring message 3 on the first uplink grant.

In this embodiment, as shown in FIG. 11, the apparatus 1100 may further include:

a third processing unit 1107 configured to operate the second timer, a duration of the second timer being identical to that of the contention resolution timer.

In this embodiment, as shown in FIG. 11, the apparatus 1100 may further include:

a fourth processing unit 1108 configured to operate the first timer; when the monitoring unit 1104 receives the message 3, the fourth processing unit 1108 starts the first timer, and the first transmitting unit 1102 transmits a contention resolution message while the first timer is running; or the fourth processing unit 1108 starts the first timer after the end of a transmission or retransmission occasion of the message 3, and the first transmitting unit 1102 transmits scheduling information of HARQ retransmission of the message 3 while the first timer is running; and the monitoring unit 1104 starts to receive transmission of the message 3 when the first timer expires.

In this embodiment, the contention resolution message may further include a C-RNTI, the C-RNTI being used to identify a terminal equipment.

With the apparatus of this embodiment, the terminal equipment may reasonably process multiple uplink grants provided by the network device, thereby improving reliability of the random access.

Embodiment 5

The embodiment of this disclosure provides a terminal equipment, including the apparatus described in Embodiment 3.

Figure 12:
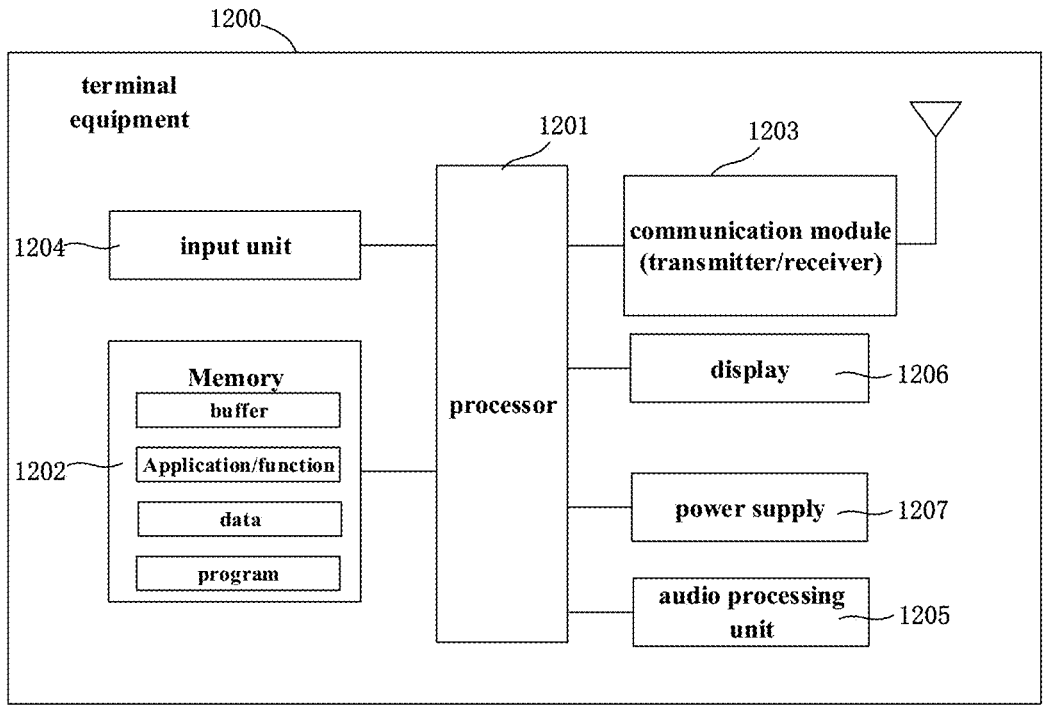
FIG. 12 is a schematic diagram of the terminal equipment of Embodiment 5.

FIG. 12 is a schematic diagram of the terminal equipment of the embodiment of this disclosure. As shown in FIG. 12, the terminal equipment 1200 may include a central processing unit 1201 and a memory 1202, the memory 1202 being coupled to the central processing unit 1201. It should be noted that this figure is illustrative only, and other types of structures may also be used, so as to supplement or replace this structure and achieve a telecommunications function or other functions.

In an implementation, the functions of the apparatus described in Embodiment 3 may be integrated into the central processing unit 1201, and the central processing unit 1201 executes functions of the apparatus described in Embodiment 3. The functions of the apparatus described in Embodiment 3 are incorporated herein, and shall not be described herein any further.

In another implementation, the apparatus described in Embodiment 3 and the central processing unit 1201 may be configured separately; for example, the apparatus described in Embodiment 3 may be configured as a chip connected to the central processing unit 1201, and the functions of the apparatus described in Embodiment 3 are executed under control of the central processing unit 1201.

As shown in FIG. 12, the terminal equipment 1200 may further include a communication module 1203, an input unit 1204, an audio processing unit 1205, a display 1206 and a power supply 1207. It should be noted that the terminal equipment 1200 does not necessarily include all the parts shown in FIG. 12. Furthermore, the terminal equipment 1200 may include parts not shown in FIG. 12, and the related art may be referred to.

As shown in FIG. 12, the central processing unit 1201 is sometimes referred to as a controller or an operational control, which may include a microprocessor or other processor devices and/or logic devices. The central processing unit 1201 receives input and controls operations of components of the terminal equipment 1200.

The memory 1202 may be, for example, one or more of a buffer memory, a flash memory, a hard drive, a mobile medium, a volatile memory, a nonvolatile memory, or other suitable devices, which may store various data, etc., and furthermore, store programs executing related information. And the central processing unit 1201 may execute programs stored in the memory 1202, so as to realize information storage or processing, etc. Functions of other parts are similar to those of the related art, which shall not be described herein any further. The parts of the terminal equipment 1200 may be realized by specific hardware, firmware, software, or any combination thereof, without departing from the scope of this disclosure.

With the terminal equipment of this embodiment, the terminal equipment may reasonably process multiple uplink grants provided by the network device, thereby improving reliability of the random access.

Embodiment 6

The embodiment of this disclosure provides a network device, including the apparatus described in Embodiment 4.

Figure 13:
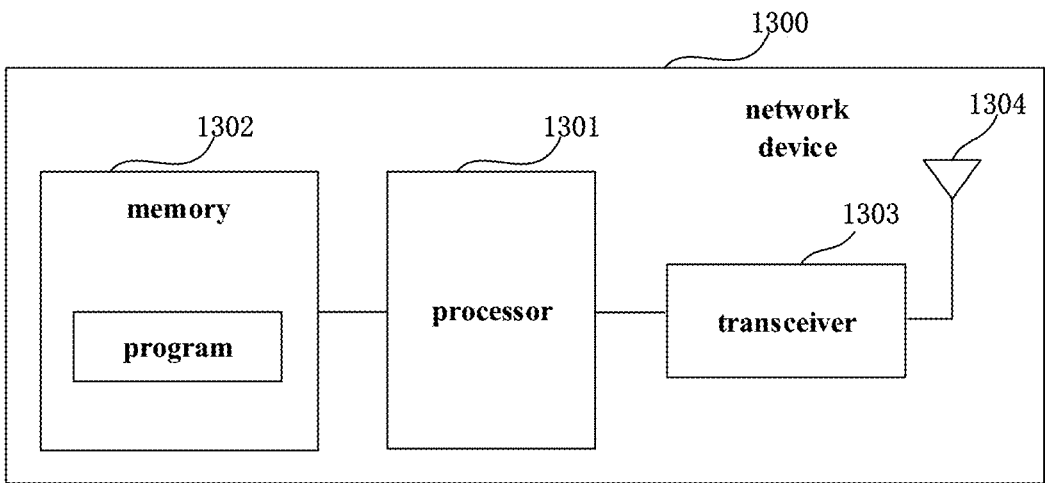
FIG. 13 is a schematic diagram of the network device of Embodiment 6.

FIG. 13 is a schematic diagram of a structure of one implementation of the network device of the embodiment of this disclosure. As shown in FIG. 13, the network device 1300 may include a central processing unit (CPU) 1301 and a memory 1302, the memory 1302 being coupled to the central processing unit 1301. The memory 1302 may store various data, and furthermore, it may store a program for data processing, and execute the program under control of the central processing unit 1301, so as to receive various information transmitted by a terminal equipment, and transmit various information to the terminal equipment.

In an implementation, the functions of the apparatus described in Embodiment 4 may be integrated into the central processing unit 1301, and the central processing unit 1301 executes functions of the apparatus described in Embodiment 4. The functions of the apparatus described in Embodiment 4 are incorporated herein, and shall not be described herein any further.

In another implementation, the apparatus described in Embodiment 4 and the central processing unit 1301 may be configured separately; for example, the apparatus described in Embodiment 4 may be configured as a chip connected to the central processing unit 1301, and the functions of the apparatus described in Embodiment 4 are executed under control of the central processing unit 1301.

Furthermore, as shown in FIG. 13, the network device 1300 may include a transceiver 1303, and an antenna 1304, etc. Functions of the above components are similar to those in the related art, and shall not be described herein any further. It should be noted that the network device 1300 does not necessarily include all the parts shown in FIG. 13. Furthermore, the network device 1300 may include parts not shown in FIG. 13, and the related art may be referred to.

With the network device of this embodiment, the terminal equipment may reasonably process multiple uplink grants provided by the network device, thereby improving reliability of the random access.

Embodiment 7

The embodiment of this disclosure provides a communication system, including a network device and a terminal equipment. The network device is, for example, the network device 1300 described in Embodiment 6, and the terminal equipment is, for example, the terminal equipment 1200 described in Embodiment 5.

In this embodiment, the terminal equipment is, for example, a UE served by a gNB, and may include conventional compositions and functions of a terminal equipment in addition to the functions of the apparatus described in Embodiment 3, which are as described in Embodiment 5, and shall not be described herein any further.

In this embodiment, the network device may be, for example, a gNB in NR, and may include conventional compositions and functions of a network device in addition to the functions of the apparatus described in Embodiment 4, which are as described in Embodiment 6, and shall not be described herein any further.

With the communication system of this embodiment, the terminal equipment may reasonably process multiple uplink grants provided by the network device, thereby improving reliability of the random access.

An embodiment of this disclosure provides a computer readable program, which, when executed in a terminal equipment, will cause a computer to carry out the method described in Embodiment 1 in the terminal equipment.

An embodiment of this disclosure provides a storage medium storing a computer readable program, which will cause a computer to carry out the method described in Embodiment 1 in a terminal equipment.

An embodiment of this disclosure provides a computer readable program, which, when executed in a network device, will cause a computer to carry out the method described in Embodiment 2 in the network device.

An embodiment of this disclosure provides a storage medium storing a computer readable program, which will cause a computer to carry out the method described in Embodiment 2 in a network device.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of this disclosure. Various variants and modifications may be made by those skilled in the art according to the spirits and principle of this disclosure, and such variants and modifications fall within the scope of this disclosure.

According to the implementations disclosed in the embodiments, the following supplements are further disclosed.

1. A signal transmission apparatus, configured in a terminal equipment, the apparatus including:

a receiving unit configured to receive a random access response, the random access response being associated with multiple uplink grants; and a transmitting unit configured to transmit a message 3 by using one or more uplink grants in the multiple uplink grants; wherein at least one uplink grant in the one or more uplink grants is used to transmit initial transmission of the message 3.

2. The apparatus according to supplement 1, wherein the random access response being associated with multiple uplink grants refers to that, the receiving unit receives multiple random access responses in a time window to receive random access response(s), an uplink grant being associated per random access response; or the receiving unit receives a random access response in a time window to receive random access response(s), multiple uplink grants being associated with the random access response.

3. The apparatus according to supplement 1, wherein the transmitting unit transmits message 3 by using the multiple uplink grants; wherein a first uplink grant in the multiple uplink grants is used to transmit initial transmission of the message 3, and a second uplink grant in the multiple uplink grants is used to transmit retransmission of the message 3.

4. The apparatus according to supplement 1, wherein the transmitting unit transmits message 3 by using the multiple uplink grants; wherein a first uplink grant in the multiple uplink grants is used for initial transmission of the message 3, and a second uplink grant in the multiple uplink grants is also used for initial transmission of the message 3.

5. The apparatus according to supplement 4, wherein a relationship between a priority of initial transmission of the message 3 and a priority of retransmission of the message 3 is:

the priority of a message 3 obtained later is higher; or, the priority of initial transmission of the message 3 is higher than the priority of retransmission of the message 3.

6. The apparatus according to supplement 4, wherein each uplink grant corresponds to a process ID, and the transmitting unit transmits initial transmission of the message 3 according to process ID to which the uplink grant corresponds, the process ID to which the uplink grant corresponds being contained in the random access response, or being pre-configured, or being obtained by the terminal equipment through calculation.

7. The apparatus according to supplement 1, wherein the transmitting unit transmits message 3 by using at least one of the multiple uplink grants, and the apparatus includes:

a first processing unit configured to receive a contention resolution message, and obtain an MAC PDU by decoding the contention resolution message; wherein, if the MAC PDU contains a contention resolution identity (ID) and the contention resolution ID does not match a contention resolution ID contained or transmitted in the message 3, it is considered that contention resolution is unsuccessful, and the first processing unit discards pending or remaining or allocated uplink grants received in the random access response.

8. The apparatus according to supplement 7, wherein when it is considered that the contention resolution is unsuccessful, the first processing unit further discard a dynamically scheduled uplink grant.

9. The apparatus according to supplement 1, wherein the transmitting unit transmits message 3 by using at least one of the multiple uplink grants, and the apparatus further includes:

a second processing unit configured to receive a contention resolution message, and obtain an MAC PDU by decoding the contention resolution message; wherein, if the MAC PDU contains a contention resolution ID and the contention resolution ID does not match a contention resolution ID contained or transmitted in the message 3, it is considered that contention resolution is unsuccessful.

10. The apparatus according to supplement 9, wherein, if the contention resolution is unsuccessful and there exists an uplink grant available for transmitting the message 3, the second processing unit transmits transmission of the message 3 by using the available uplink grant.

11. The apparatus according to supplement 9, wherein, if the contention resolution is unsuccessful and there exists no uplink grant available for transmitting the message 3, the second processing unit performs at least one of the following behaviors: clearing an HARQ buffer used for transmission of an MAC PDU in a buffer of the message 3; adding 1 to a preamble transmission counter; indicating a random access problem to upper layers if the counter reaches a maximum value+1, and considering that the random access procedure unsuccessful completed if the random access procedure is triggered for system information request; and returning to a random access resource selection process if the random access process is not completed.

12. The apparatus according to supplement 9, wherein if the contention resolution is unsuccessful, the second processing unit does not discard a TC-RNTI received in the random access response.

13. The apparatus according to supplement 1, wherein the transmitting unit transmits message 3 by using at least one of the multiple uplink grants, and the apparatus further includes:

a third processing unit configured to, if there exists no uplink grant available for transmitting the message 3 and a contention resolution timer expires or a first timer expires, discard a TC-RNTI received in the random access response, consider contention resolution unsuccessful, and discard a successfully decoded MAC PDU.

14. The apparatus according to supplement 1, wherein the transmitting unit transmits message 3 by using at least one of the multiple uplink grants, and the apparatus further includes:

a fourth processing unit configured to, if there is no uplink grant available for transmitting the message 3, discard the TC-RNTI received in the random access response, consider the contention resolution unsuccessful, and discard the MAC PDU that is successfully decoded.

15. The apparatus according to supplement 1, wherein the multiple uplink grants are located in a licensed frequency band or an unlicensed frequency band, and the apparatus further includes:

a fifth processing unit configured to start or restart a contention resolution timer after the end of a transmission or retransmission occasion of the message 3;

wherein if a CCCH SDU is included in the message 3 and PDCCH transmission is addressed to a TC-RNTI, and if a MAC PDU is successfully decoded, the MAC PDU contains a contention resolution ID and the contention resolution ID matches a contention resolution ID transmitted in the message 3, the fifth processing unit stops the contention resolution timer.

16. The apparatus according to supplement 1, wherein the multiple uplink grants are located in an unlicensed frequency band, and the apparatus further includes:

a sixth processing unit configured to start the contention resolution timer when LBT of transmission of the message 3 is successful;

wherein if all transmissions of message 3 fail and/or the contention resolution timer expires, the sixth processing unit restarts from the random access resource selection process or indicates the random access problem to upper layers.

17. The apparatus according to supplement 1, wherein the apparatus further includes:

a seventh processing unit configured to start a first timer after the end of a transmission or retransmission occasion of the message 3, monitor a contention resolution message while the first timer is running, monitor scheduling information of HARQ retransmission of the message 3, and allow transmission or transmission attempts of the message 3 when the first timer expires.

18. The apparatus according to supplement 9 or 10 or 12 or 13, wherein the contention resolution message includes a C-RNTI, and the terminal equipment uses the C-RNTI as its own C-RNTI.

1A. A signal transmission apparatus, configured in a network device, the apparatus including:

a receiving unit configured to receive a random access preamble; and a first transmitting unit configured to transmit a random access response, the random access response being associated with multiple uplink grants, the multiple uplink grants being used for transmission of a message 3; wherein at least one uplink grant in the multiple uplink grants is used for initial transmission of the message 3.

2A. The apparatus according to supplement 1A, wherein the random access response being associated with multiple uplink grants refers to that, one random access response is associated with one uplink grant, and the network device transmits multiple random access responses in a time window to receive random access response(s); or one random access response is associated with multiple uplink grants.

3A. The apparatus according to supplement 1A, wherein the multiple uplink grants are used for transmission of message 3; and wherein a first uplink grant in the multiple uplink grants is used for initial transmission of the message 3, and a second uplink grant in the multiple uplink grants is used for retransmission of the message 3.

4A. The apparatus according to supplement 1A, wherein the multiple uplink grants are used for transmission of message 3; and wherein a first uplink grant in the multiple uplink grants is used for initial transmission of the message 3, and a second uplink grant in the multiple uplink grants is also used for initial transmission of the message 3.

5A. The apparatus according to supplement 4A, wherein the second uplink grant and an uplink grant corresponding to the retransmission of message 3 to which the first uplink grant corresponds may occupy different time-domain resources.

6A. The apparatus according to supplement 4A, wherein the random access response includes HARQ process IDs to which the uplink grants correspond, and HARQ process to which the HARQ process IDs correspond are used for transmission of the message 3 to which the uplink grants correspond.

7A. The apparatus according to supplement 4A, wherein the apparatus further includes:

a second transmitting unit configured to transmit configuration information, the configuration information configuring the HARQ process ID to which the uplink grant corresponds, if the number of HARQ process IDs is identical to the number of the multiple uplink grants, the HARQ process IDs and the multiple uplink grants may correspond one-to-one, and if the number of the HARQ process IDs is less than the number of the multiple uplink grants, the HARQ process IDs and the multiple uplink grants may map to each other according to a predetermined rule.

8A. The apparatus according to supplement 1A, wherein the apparatus further includes:

a monitoring unit configured to monitor the message 3 on one of the multiple uplink grants;

wherein if the message 3 is received and the message 3 includes a first contention resolution ID, the first transmitting unit transmits a contention resolution message, the contention resolution message including a second contention resolution ID, and the second contention resolution ID being identical to the first contention resolution ID contained in the message 3.

9A. The apparatus according to supplement 8A, wherein the apparatus further includes:

a first processing unit configured to stop monitoring the messages 3 on pending or remaining or allocated uplink grants in the multiple uplink grants.

10A. The apparatus according to supplement 9A, wherein, the first processing unit further stops monitoring message 3 on a dynamically scheduled uplink grant 11A. The apparatus according to supplement 8A, wherein the apparatus further includes:

a second processing unit configured to perform data transmission by using the pending or remaining or allocated uplink grant in the multiple uplink grants.

12A. The apparatus according to supplement 8A, wherein, if there exists a pending or remaining or allocated first uplink grant in the multiple uplink grants, the monitoring unit monitors the message 3 on the first uplink grant;

and if the message 3 is received and the message 3 includes a first contention resolution ID, the first transmitting unit transmits a contention resolution message, the contention resolution message including a second contention resolution ID, and the second contention resolution ID being identical to the first contention resolution ID contained in the message 3.

13A. The apparatus according to supplement 8A, wherein, if there exists a pending or remaining or allocated first uplink grant in the multiple uplink grants and a second timer is running, the monitoring unit monitors the message 3 on the first uplink grant;

and if the message 3 is received and the message 3 includes a first contention resolution ID, the first transmitting unit transmits a contention resolution message, the contention resolution message including a second contention resolution ID, and the second contention resolution ID being identical to the first contention resolution ID contained in the message 3.

14A. The apparatus according to supplement 8A, wherein, if the multiple uplink grants have no pending or remaining or allocated first uplink grant, the monitoring unit stops monitoring message 3; or if a second timer expires, the monitoring unit stops monitoring message 3 on the first uplink grant.

15A. The apparatus according to supplement 13A or 14A, wherein the apparatus further includes:

a third processing unit configured to operate the second timer, a duration of the second timer being identical to that of the contention resolution timer.

16A. The apparatus according to supplement 8A, wherein the apparatus further includes:

a fourth processing unit configured to operate a first timer;

and when the monitoring unit receives the message 3, the fourth processing unit starts the first timer, and the first transmitting unit 1102 transmits a contention resolution message while the first timer is running; or the fourth processing unit starts the first timer after the end of a transmission or retransmission occassion of the message 3, and the first transmitting unit transmits scheduling information of HARQ retransmission of the message 3 while the first timer is running;

and the monitoring unit starts to receive transmission of the message 3 when the first timer expires.

17A. The apparatus according to supplement 12A or 13A, wherein the contention resolution message further includes a C-RNTI, the C-RNTI being used to identify a terminal equipment.

The invention claimed is:

1. A signal transmission apparatus, configured in a terminal equipment, the apparatus comprising:

a receiver configured to receive one random access response within a random access response receive window, the random access response being associated with a bundle of uplink grants for transmissions of a TB; and a transmitter configured to transmit a message 3 by using multiple uplink grants in the bundle of uplink grants;

wherein a first uplink grant in the multiple uplink grants is used to transmit initial transmission of the message 3, and a second uplink grant in the multiple uplink grants is used to transmit retransmission of the message 3, wherein the apparatus further comprises:

processor circuitry configured to start a contention resolution timer after an end of the retransmission(s) of message 3 within the multiple uplink grants in the bundle of uplink grants, regardless of an LBT result of the message 3;

wherein in a case that the transmitter transmits the message 3 including a CCCH SDU, if PDCCH transmission is addressed to a TC-RNTI and a MAC PDU is successfully decoded and if the MAC PDU comprises a contention resolution ID and the contention resolution ID matches a contention resolution ID transmitted in the message 3, the processor circuitry considers a contention resolution successful.

2. The apparatus according to claim 1, wherein the apparatus further comprises:

first processor circuitry configured to receive a contention resolution message, and obtain an MAC PDU by decoding the contention resolution message; wherein, if the MAC PDU comprises a contention resolution ID and the contention resolution ID does not match a contention resolution ID contained or transmitted in the message 3, it is considered that contention resolution is unsuccessful, and the first processor circuitry discards pending or remaining or allocated uplink grants received in the random access response.

3. The apparatus according to claim 1, wherein the apparatus further comprises:

second processor circuitry configured to receive a contention resolution message, and obtain an MAC PDU by decoding the contention resolution message; wherein, if the MAC PDU comprises a contention resolution ID and the contention resolution ID does not match a contention resolution ID contained or transmitted in the message 3, it is considered that contention resolution is unsuccessful.

4. The apparatus according to claim 3, wherein, if the contention resolution is unsuccessful and there exists an uplink grant available for Msg-3 transmission, the second processor circuitry transmits transmission of the message 3 by using the available uplink grant.

5. The apparatus according to claim 1, wherein the apparatus further comprises:

third processor circuitry configured to, if there exists no uplink grant in the more than one uplink grant received by the receiver available for Msg-3 transmission, discard a TC-RNTI received in the random access response, consider that contention resolution is unsuccessful, and discard a successfully decoded MAC PDU.

6. The apparatus according to claim 1, wherein the apparatus further comprises:

seventh processor circuitry configured to start a first timer at a transmission or a retransmission occasion after the end of the message 3, monitor a contention resolution message while the first timer is running, monitor scheduling information of HARQ retransmission of the message 3, and allow transmission or transmission attempts of the message 3 when the first timer expires.

7. A signal transmission apparatus, configured in a network device, the apparatus comprising:

a receiver configured to receive a random access preamble; and a transmitter configured to transmit one random access response within a random access response receive window to a terminal equipment, the random access response being associated with a bundle of uplink grants for transmissions of a TB, multiple uplink grants in the bundle of uplink grants being used for transmission of a message 3; wherein a first uplink grant of the multiple uplink grants in the bundle of uplink grants is used for an initial transmission of the message 3, and a second uplink grant of the multiple uplink grants in the bundle of uplink grants is used for retransmission of the message 3;

wherein the terminal equipment starts a contention resolution timer after an end of the retransmission(s) of message 3 within the multiple uplink grants in the bundle of uplink grants, regardless of an LBT result of the message 3;

wherein in a case that the terminal equipment transmits the message 3 including a CCCH SDU, if PDCCH transmission is addressed to a TC-RNTI and a MAC PDU is successfully decoded and if the MAC PDU comprises a contention resolution ID and the contention resolution ID matches a contention resolution ID transmitted in the message 3, the processor circuitry considers a contention resolution successful.

8. The apparatus according to claim 7, wherein the random access response being associated with the bundle of uplink grants refers to that, one random access response is associated with one uplink grant, and the network device transmits multiple random access responses in a time window to receive random access response(s); or one random access response is associated with the bundle of uplink grants.

9. The apparatus according to claim 7, wherein the apparatus further comprises:

a monitoring unit configured to monitor the message 3 on one of the bundle of uplink grants;

wherein if the message 3 is received and the message 3 comprises a first contention resolution ID, the transmitter transmits a contention resolution message, the contention resolution message comprising a second contention resolution ID, and the second contention resolution ID being identical to the first contention resolution ID contained in the message 3.

10. The apparatus according to claim 9, wherein the apparatus further comprises:

processor circuitry configured to stop monitoring the messages 3 on pending or remaining or allocated uplink grants in the bundle of uplink grants.

11. The apparatus according to claim 9, wherein, if there exists a pending or remaining or allocated first uplink grant in the bundle of uplink grants, the monitoring unit monitors the message 3 on the first uplink grant;

and if the message 3 is received and the message 3 comprises a first contention resolution ID, the transmitter transmits a contention resolution message, the contention resolution message comprising a second contention resolution ID, and the second contention resolution ID being identical to the first contention resolution ID contained in the message 3.

12. The apparatus according to claim 11, wherein the contention resolution message further comprises a C-RNTI, the C-RNTI being used to identify a terminal equipment.

13. A communication system, comprising:

a network device configured with an apparatus comprising:

a receiver configured to receive a random access preamble, and a transmitter configured to transmit a random access response, the random access response being associated with a bundle of uplink grants for transmissions of a TB, the bundle of uplink grants being used for transmission of a message 3; wherein a first uplink grant in the bundle of uplink grants is used for an initial transmission of the message 3; and a second uplink grant in the bundle of uplink grants is used to transmit retransmission of the message 3, a terminal equipment configured with an apparatus comprising:

a receiver configured to receive a random access response, the random access response being associated with the bundle of uplink grants for transmissions of a TB; and a transmitter configured to transmit a message 3 by using multiple uplink grants in the bundle of uplink grants, wherein a first uplink grant in the multiple uplink grants is used to transmit initial transmission of the message 3, and a second uplink grant in the multiple uplink grants is used to transmit retransmission of the message 3, wherein the apparatus further comprises:

processor circuitry configured to start a contention resolution timer after an end of the retransmission(s) of message 3 within the multiple uplink grants in the bundle of uplink grants, regardless of an LBT result of the message 3, wherein in a case that the transmitter transmits the message 3 including a CCCH SDU;

if PDCCH transmission is addressed to a TC-RNTI and a MAC PDU is successfully decoded, and if the MAC PDU comprises a contention resolution ID and the contention resolution ID matches a contention resolution ID transmitted in the message 3, the processor circuitry considers a contention resolution successful.

* * * * *